(12) United States Patent
Becker

(10) Patent No.: US 6,294,888 B1
(45) Date of Patent: Sep. 25, 2001

(54) FREQUENT START PROTECTION AND ECONOMIZER CONTROL FOR A MOTOR STARTER

(75) Inventor: James A. Becker, Grafton, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/505,937

(22) Filed: Feb. 15, 2000

Related U.S. Application Data
(60) Provisional application No. 60/124,221, filed on Mar. 12, 1999.

(51) Int. Cl.[7] ............................................. H02H 5/04
(52) U.S. Cl. .............................. 318/471; 318/473; 361/25
(58) Field of Search ................................... 318/471, 473; 361/24, 25

(56) References Cited

U.S. PATENT DOCUMENTS

| | | | | |
|---|---|---|---|---|
| 3,585,451 | * | 6/1971 | Day, III ................................. 317/13 |
| 4,207,602 | * | 6/1980 | Kussy et al. .......................... 361/26 |
| 4,434,390 | * | 2/1984 | Elms ...................................... 318/473 |
| 5,220,478 | * | 6/1993 | Innes et al. ............................. 361/93 |
| 5,418,677 | * | 5/1995 | Engel ..................................... 361/25 |
| 5,525,881 | * | 6/1996 | Desrus ................................... 318/471 |
| 5,539,601 | * | 7/1996 | Farag ..................................... 361/23 |
| 6,087,800 | * | 7/2000 | Becker et al. ......................... 318/778 |
| 6,122,153 | * | 9/2000 | Becker ................................... 361/25 |

* cited by examiner

Primary Examiner—Robert E. Nappi
Assistant Examiner—Rita Leykin
(74) Attorney, Agent, or Firm—Timothy J. Ziolkowski

(57) ABSTRACT

A motor starter control is disclosed in which an ambient temperature sensor is positioned to sense ambient temperature and pole temperature sensors are used to sense each pole temperature in a motor starter. A microprocessor is connected to periodically receive the temperature signals and monitor change in operating temperature of a motor starter system. The microprocessor models cool down characteristics of the motor starter system and compares currently acquired ambient and pole temperature signals to the modeled cool down characteristics and determines whether the motor starter system is cooled to a safe start temperature. The control ensures that a maximum number of starts per hour is not exceeded and prevents attempted starts that not only waste energy, but further prolong time to a successful start.

31 Claims, 3 Drawing Sheets

FREQUENT START PROTECTION AND ECONOMIZER CONTROL FOR A MOTOR STARTER

CROSS-REFERENCE TO RELATED APPLICATION

This application claims the benefit of prior U.S. Provisional Application Ser. No. 60/124,221 filed Mar. 12, 1999 and entitled SOFT STARTER FREQUENT START PROTECTION AND ECONOMIZER.

BACKGROUND OF THE INVENTION

The present invention relates generally to control systems for motor starters, and more particularly to a method and apparatus to economize the function of a motor.

Many electrical mechanical motor starters use bimetallic overload elements to protect a motor during startup and while the motor is running. A typical overload element conducts motor current through it, which in turn causes it to heat up and go into a stressed condition that results in the element changing shape. In some high horse power applications, a current transformer is used to power the overload element. The current transformer provides a current that is proportional to the motor current to cause the element to change shape when the current reaches a certain level. When the motor is turned off, or when an overload trips due to load conditions, the bimetallic element remains in the stressed condition until it cools, regardless of whether or not the motor can be safely started again. When a start command is received and the bimetallic elements are still in the stressed position the motor is prevented from starting. Conversely, once the bimetallic elements have cooled and moved back to their normal position, the overload contacts allow the motor to be started regardless of the temperature of the motor. Also, since the overload elements are still warm from the last trip, the amount of heat that can be tolerated for a specified class of motor is reduced by the amount of heat that is still in the bimetallic element, which can cause the overload elements to become stressed and again change state preventing the motor from obtaining its proper run speed.

In solid state controlled motor starters, once the motor is turned off, or the processor overload trips due to load conditions, the thermistor elements that are located on the current carrying conductors of a motor circuit remain hot after the motor stops. If a restart command is given while the thermistor elements are still sending a high voltage signal due to high thermistor resistance, the processor reacts by engaging the motor protect or disconnect circuits and prevents the motor from starting. If the thermistor components have cooled only slightly, but are still warm due to the amount of retained heat in the motor circuit, they produce a low voltage signal. The processor then disengages the motor protect or disconnects circuits, thereby allowing the motor to start. However, since the thermistor elements are warm due to the amount of retained heat in the motor conductor circuits, a very low amount of additional heat can be tolerated for a specified class of motor start. Thus, the processor will see the thermistor elements again change resistance and prevent the motor from obtaining its proper run speed under load. In order for the motor to obtain its proper run speed for a complete start, the thermistor elements and motor conductors must cool down to the ambient temperature, which typically is longer than necessary for the given class.

Yet another microprocessor overload scheme uses a toroid that provides a signal to various solid state components for signal processing, measuring, and comparing to a reference voltage. The processor reacts by engaging the motor protection circuit and stops the motor when the signal voltages reach an overload condition. However, when a motor is stopped by a stop command or by the processor overload command, the motor is typically quite hot. If a restart command is given, the processor will attempt to restart the motor. The retained heat in the motor increases the internal resistance of the motor windings and thereby effectively reduces the starting current to the motor. The reduced starting current then causes the motor to remain in the inrush portion of the starting curve longer than the processor overload electronics will typically allow and engages the motor protection circuit, thereby stopping the motor prematurely.

These nuisance trips that occur during startup place unnecessary stress on the motor and the load it is driving, and reduces the mechanical life of the overall system. The overload elements and motor components must therefore cool down to the ambient temperature to allow a complete start and avoid such nuisance trips. Additionally, this large inrush for an insufficient time, not only prevents the motor from starting completely, which causes the aforementioned stresses and shortened mechanical life, but also is a waste of electrical power, thereby increasing electric utility bills.

Some attempts have been made to overcome these problems with the use of a fixed time delay scheme to allow the motor controller sufficient time to cool down, but have failed to solve the problem sufficiently. For example, if the cool down time is set for too long of a period, it will delay the time of the next motor start and interfere with production or productivity. If it is set for a too short of a time period, it will cause nuisance tripping of the overload and prevent motor starting, just as in the aforementioned examples.

It would therefore be desirable to have a frequent start protection and economizer scheme that eliminates the need of bimetallic elements and/or fixed time delays, that would be capable of determining if a motor starter system has sufficiently cooled and is safe to start, while not exceeding a maximum number of starts per hour.

SUMMARY OF THE INVENTION

The present invention provides a motor starter frequent start protection and economizer control that solves the aforementioned problems without adding significant costs to the overall system.

The present invention solves the aforementioned problems by providing a control that allows a motor to start completely several times in rapid succession based on the ambient, overload, and motor conditions. The control models the motor and soft starter cool down characteristics and compares them to the actual ambient and soft starter pole temperatures and a modeled external ambient temperature. Another comparison is then made with the last successful start conditions, and if the control determines the present start attempt will be successful, yet another check determines if the present start falls within a maximum number of starts per hour based on customer desires and factory specifications. If the conditions are satisfactory, the start will be allowed. If not, a start flag is generated and a digital display outputs the time needed until a successful start can be accomplished. The display can also show the maximum number of starts allowed per hour, as well as the actual number of starts made.

A motor starter control for use with such a motor starter system, according to the present invention, includes an ambient temperature sensor to sense ambient temperature about a motor starter, and a pole temperature sensor for each pole in the motor starter to determine an operating temperature of the motor starter. A processing unit is connected to the ambient and pole temperature sensors and is programmed to periodically acquire the ambient and pole temperatures and model cool down characteristics of the motor starter system. The microprocessor also compares currently acquired ambient and pole temperatures to the modeled cool down characteristics and determines whether the motor start system is cooled to a safe start temperature before allowing a start to occur.

In accordance with another aspect of the invention, a method of protecting a motor and a motor starter and provide frequent start protection and an economizer function, includes the steps of periodically monitoring ambient and pole temperatures in a motor starter as an indication of a motor starter temperature and recording the periodically acquired temperatures. The process cyclically checks the motor starter temperature to ensure the motor starter temperature has cooled to a safe start temperature, and if so, ensures that the current start parameters are within a safe operating range. If they are, and a maximum number of starts per time period has not been exceeded, a motor start is enabled. Otherwise, the process is allowed to cool further until a successful start is obtainable, which avoids unnecessary heat buildup due to unsuccessful start attempts.

In accordance with yet another aspect of the invention, a motor starter control is disclosed for protecting a motor and a motor starter having ambient and pole temperature sensors and a microprocessor for modeling cool down characteristics after the motor is turned off. The cool down characteristics are based on the ambient and pole temperatures acquired by the ambient and pole temperature sensors, together with physical characteristics of the starter, the motor, and the operating environment. The control ensures the motor is sufficiently cooled before a start is allowed and that a maximum number of starts per time period is not exceeded before allowing another motor start.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
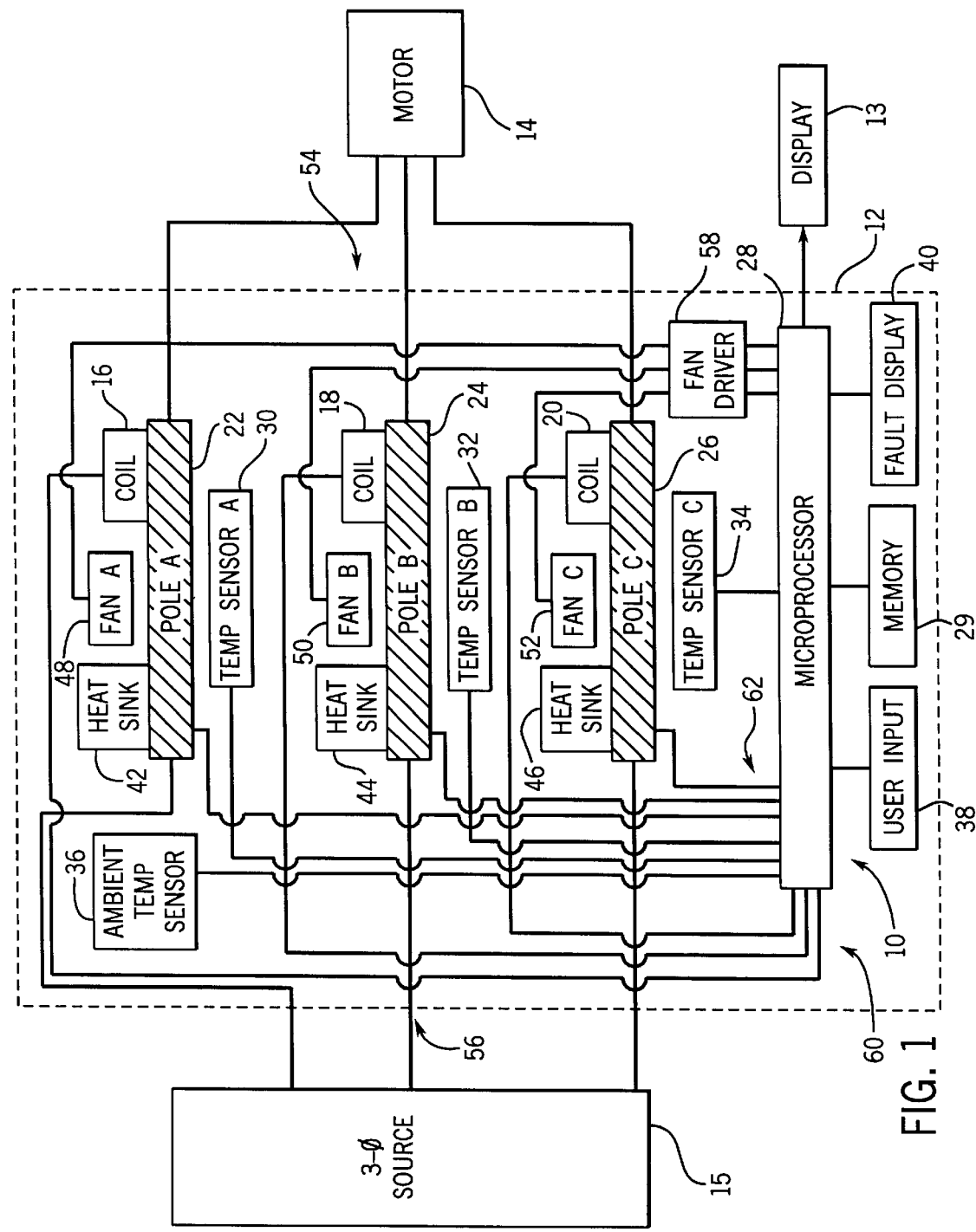
FIG. 1 is a block diagram of a motor connected to a three-phase source through a motor starter incorporating the present invention.

FIG. 1 is a block diagram of a motor starter control 10, according to the present invention, incorporated into a motor starter system having a motor starter 12 controlling a motor 14 connected to a power source 15. Control 10 includes a central processing unit 28, such as a microprocessor, a microcontroller, a PLC, or any other device for electrical signal processing. The motor starter control 10 controls the function of the motor starter 12 based on the operating temperatures of the device 12, the internal ambient temperature of the device, the external ambient temperature of the operating environment, and the motor 14, together with look-up tables stored in memory 29. In addition to temperature and thermal protection, the control allows frequent starts, while preventing attempted starts that would be unsuccessful and that cause further delay and waste energy.

As shown in FIG. 1, the control 10 of the present invention is shown in a three-phase motor starter application. In a manner that is known, the motor starter 12 relays power from a three-phase source 15 to the motor 14, in part by controlling coils 16, 18, and 20, and in part by controlling a pair of SCRs (not shown) that are typically clamped between two conducting bus bars, which is shown in block diagram form as pole A 22, pole B 24, and pole C 26.

The microprocessor 28 of the motor starter control 10 receives input signals from a number of temperature sensors. In a preferred embodiment, a temperature sensor 30, 32, 34 is located on each power pole A, B, C. That is, temperature sensor 30 is in thermal communication with power pole 22, temperature sensor 32 is in thermal communication with power pole 24, and temperature sensor 34 is in thermal communication with power pole 26. An ambient temperature sensor 36 is also located within the motor starter 12 and connected to the microprocessor 28. In a preferred embodiment, the ambient temperature sensor 36 is located in a cover assembly between poles A and B or between poles B and C to sense the ambient temperature across the poles and within the housing enclosing motor starter 12.

The microprocessor 28 is also capable of receiving at least one input 38, such as a dip-switch, that can override a temperature protection control to prevent the motor from shutting down when a fault is detected. The control can indicate and display the fault on fault display 40. The override feature is typically only used in critical processes where the motor can be sacrificed in order to keep the process functioning.

The motor starter 12 also includes heat sinks 42, 44, and 46 mounted to each power pole, 22, 24, and 26, respectively. Each power pole 22, 24, and 26 also has an associated fan 48, 50 and 52, respectively, to draw air into the load side 54 of the motor starter 12, move the air across each heat sink 42, 44 and 46, and discharge the air out a line side 56 of the motor starter 12. The microprocessor 28 is connected to a fan driver 58, which in turn drives the fans 48, 50 and 52. The microprocessor 28 also has output control lines 60 for controlling the coils 16, 18, and 20 as well as output control line 62 connected to control the SCRs of each pole 22, 24 and 26.

The motor starter 12 is also connectable to a display device 13 with external connection so that the display 13 can be mounted to the motor starter 12 or remotely. Internally, the display device 13 is connected to the processor 28 and is used to display a time to a next motor start after the thermal protection control has been activated, as will be further described with reference to FIG. 2. The display 13 is also capable of displaying a maximum number of starts per hour allowed, as well as a total number of actual starts per hour, including attempted starts. In this manner, an operator can easily determine if a requested start will exceed a maximum number of allowed starts. Where the fault display 40 is typically a warning light, the display device 13 is preferably a digital read-out to show the calculated time until a next start.

Figure 2:
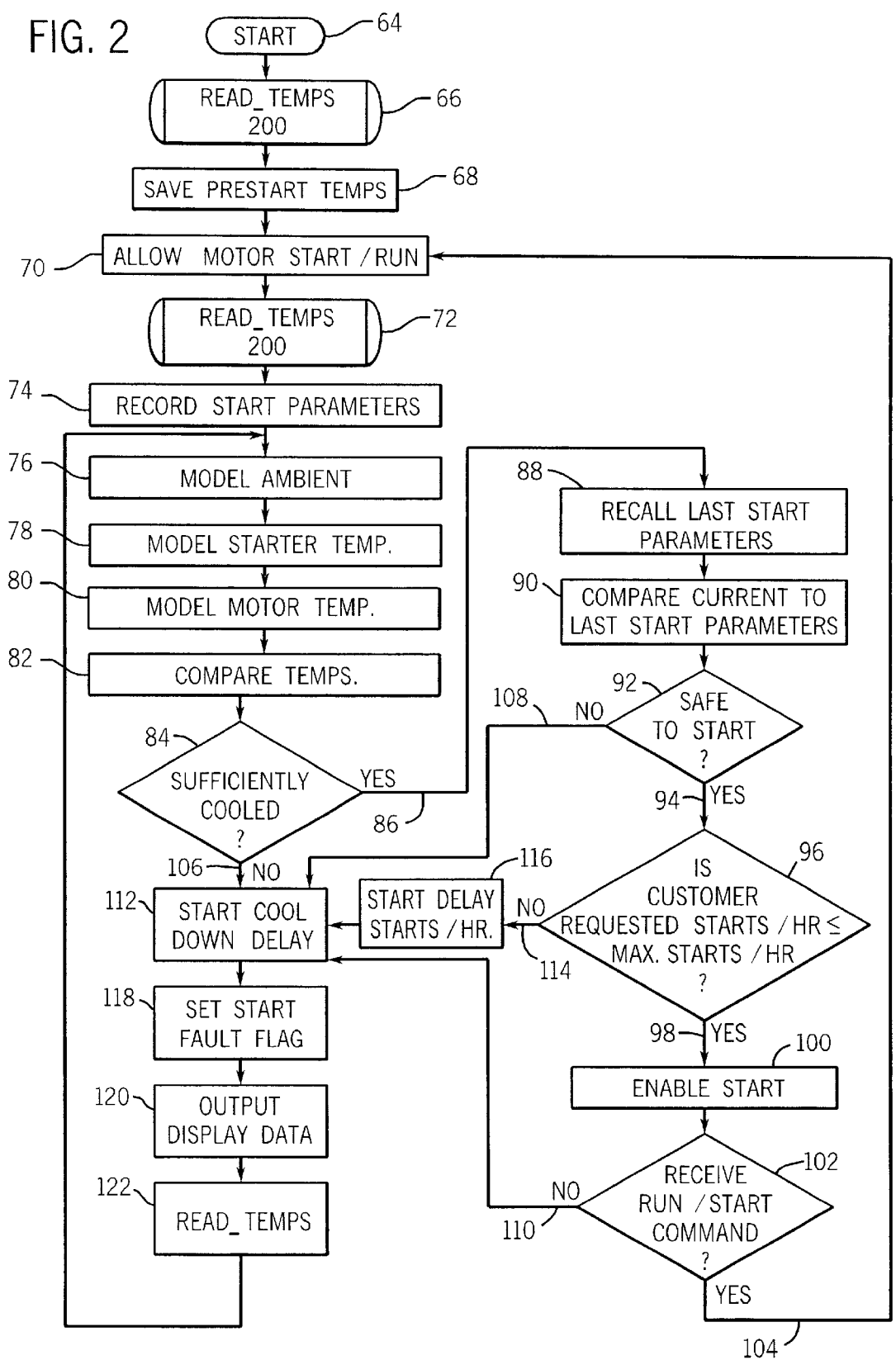
FIG. 2 is a flow chart of software as programmed in the microprocessor of FIG. 1.

The operation of the control will now be described with reference to FIGS. 2–3. Referring to FIG. 2, the microprocessor is programmed, upon a start command 64, to read the temperatures in the motor starter prior to start-up of the motor at 66. The Read_Temps is a subroutine and is cyclically called in the main algorithm of FIG. 2, and will now be described with reference to FIG. 3.

Figure 3:
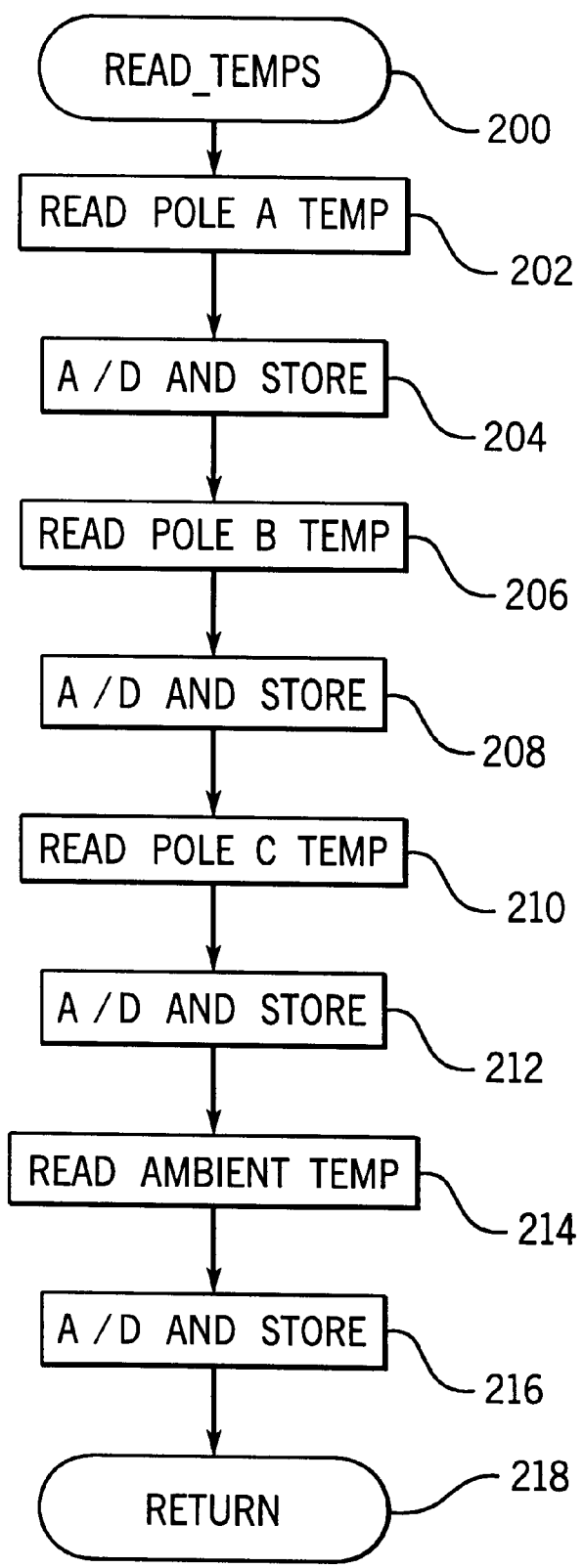
FIG. 3 is a flow chart subroutine as called for in the flow chart of FIG. 2.

As shown in FIG. 3, when the Read_Temps subroutine 200 is called, the microprocessor first reads the temperature of pole A 202 from the first temperature sensor 30, and after converting the analog signal to a digital signal, the result is stored in memory 204. The temperature of pole B 206 is then read and converted from an analog signal to a digital signal, and the result is stored in memory at 208. The third temperature sensor 34 is read to acquire the temperature of pole C 210 and then stored as a digital value 212. The ambient temperature is read at 214 by sensing ambient sensor 36, the signal is converted and stored at 216, and the Read_Temps subroutine returns 218 to the main algorithm of FIG. 2.

Referring back to FIG. 2, after the Read_Temps 200 algorithm is complete at 66, the initial values are saved at 68 and the motor is allowed to start 70. That is, the frequent start protection and economizer control of the present invention relinquishes control of the motor starter to a main control, which is not a subject of this invention.

Once the motor is running, the temperatures of the power poles and the ambient are read at 72, and stored as initial start-up parameters 74. The processor uses the ambient temperature signals generated by the ambient temperature sensor 36 in the starter to model a profile of the external temperature 76 together with predetermined environmental data stored in memory 29. That is, the external ambient model is a function of the geographical region temperatures, the building/zone location and the work day calendar. These are the preferred parameters, but other such factors can also be used in determining the external ambient model.

The ambient temperature signal is also used together with the pole temperature signals to model the starter temperature 78 and the motor temperature 80, the results of which are stored in memory 29 in the form of a look-up table. The motor temperature model 80 includes a cool down profile which is acquired after the motor is shut down and the temperatures are read periodically during a normal cool down cycle.

The starter temperature model is a function of the three pole temperature sensors 30, 32, and 34, together with the specifications such as the frame size of the starter, the FLA (full load amperage) rating, FLA duration, starts required per hour and the duration of the starts per hour. Additionally, the lock rotor count (LRC) of the motor and the LRC duration of the motor can be factored into the starter temperature model as well as the trip class and gage of wire used. The motor cool down profile includes much of the same data as the starter, such as FLA and FLA duration, starts per hour, starts per hour duration, LRC and LRC duration, trip class and gage used. It also includes the specific location of the motor, if different from the starter, including geographic region and/or zone or location in the building and the time of day the motor is operational. The motor manufacturing specifications are also used in the cool down model include motor service factor, motor horsepower, and motor frame size.

Referring back to FIG. 2, in a temperature comparison module 82, the temperature of the starter components and the load are used to determine the current temperature of the overall starter system wherein the rise in temperature can be monitored by the system. In the compare temps. module 82, the cool down curves are compared with the internal and external ambients. Also, the pole temperatures are compared with the internal and external ambients to determine the overall temperature of the system.

Once the system temperature has been determined, the processor next determines if the starter system has sufficiently cooled 84 based on the present operating temperatures. If it has 86, the last successful start parameters are then recalled from memory 88. The start parameters include the last start time, the last start temperature, and the last start current. The processor then compares 90 the currently acquired ambient and pole temperature signals together with the modeled cool down characteristics to the last successful start parameters, and then determines whether it is safe to start the motor 92.

Once the system compares the cool down temperature status with the last successful start data 90, based on those results, it determines that a start will be successful 92. If so, 94, a customer and factory set frequent start comparison 96 is then made which compares the actual number of starts per hour with a factory set number of starts per hour based on the ampacity and horsepower rating of the starter and motor and user specifications. That is, the processor maintains a running total of the number of starts previously made in a given time period, periodically checks to see if the total number of previous starts together with a current start request, exceeds a total number of allowed starts per given time period at 96. If the number of starts exceeds a maximum number of starts 96, 114, a start delay is initiated at 116 to safeguard the starter and the motor.

If it is determined at 96 that the starter should be allowed to start the motor 98 because the total previous starts, including the current start request, is equal to or less than the maximum starts per hour, a start is enabled 100. If the start command is present 102, 104, the motor is allowed to start at 70.

However, if it is determined that the motor starter system has not sufficiently cooled 84, 106, or if the processor determines it is not safe to start the motor 92, 108, or if the start command has not been received 102, 100, a start cool down delay 112 is initiated. The start cool down delay 112 is calculated by the processor based on the characteristic modeling 76, the starter temperature modeling 78, the motor temperature modeling 80, and the current temperatures 72, 122. The cool down delay determines a time needed for sufficient cooling before the starter is allowed to start the motor. When the most current temperatures and cool down profiles are compared to the last start parameters 90, and it is not safe to start the motor 92, 108, the processor also calculates a cool down time needed to start based on those variables.

The algorithm then sets a start fault flag 118 if the motor starter system is above a safe start temperature 106, it is not safe to start the motor 108, or the number of starts requested has exceeded a maximum starts per time period 114. The processor also outputs those times to a digital readout display 120 to display the time needed until a start will be allowed. The processor is also capable of outputting an allowed number of starts per time period (max starts/hr), as well as the number of starts already made during that time period. The temperatures are then again read 122, and the system cycles back to the modeling steps 76, 78, and 80, and recycles through the aforementioned process.

Accordingly, the present invention includes a motor starter control for use with a motor starter system having at least a motor starter and a motor, the control including an ambient temperature sensor sensing an internal ambient temperature of the starter, and a pole temperature sensor for sensing a temperature of each pole of the sensor. A processing unit is connected to the ambient and pole temperature sensors and is programmed to model cool down characteristics of the motor starter system, and periodically acquiring the ambient and pole temperatures. The processor compares currently acquired ambient and pole temperature signals to the model cool down characteristics and determines whether the motor starter is cooled to a safe start temperature.

The processing unit is also programmed to prevent the motor from starting a motor until a cool down temperature is reached that will allow a successful motor start, based on the modeled cool down characteristics. These characteristics include an ambient temperature model that models the temperature about the motor starter system. The modeling for the starter and the motor also include physical characteristics of the particular model chosen. The processing unit is programmed to compare the currently acquired ambient and pole temperatures, with the modeled cool down characteristics, to a set of last start parameters, such as the last start current and last start time, to determine whether a present start will be successful. The control ensures that a present start attempt is within a maximum number of starts per time period. A fault display is activated if a motor starter system is above a safe start temperature and a start command is received, or if based on the last start parameters, a safe start cannot be accomplished, or if the starter system has exceeded a maximum number of starts per hour. A digital display is also provided to display a time needed to a next start, as well as the maximum number of starts allowed, and the number of starts already made per time period.

In accordance with another aspect of the invention, a method of protecting a motor and a motor starter includes periodically monitoring ambient and pole temperatures in a motor starter as an indication of motor starter temperature and recording the periodically monitored temperatures. The process cyclically checks the motor starter temperatures to ensure that the motor starter temperature has cooled to a safe start temperature. If so, the process ensures that the current start parameters are within a safe range, and if they are, enables a motor start. Otherwise, the motor is prevented from starting, and the system is allowed to further cool.

The method also includes tracking motor cool down by periodically monitoring the ambient and pole temperatures during a motor cool down period and modeling external ambient temperature, starter temperature, and motor temperature based on the tracking and pre-determined data for a motor, a starter, and an ambient condition for a given application. The method includes checking if a current start request, when added to a total number of previous starts per time period, exceeds a total number of allowed starts per time period. If the total number of allowed starts is exceeded, or is about to be exceeded by a current request, a start delay is initiated until the total number of previous starts is less than the total number of allowed starts. The process includes displaying a time needed until a next start will be allowed as well as displaying that a fault occurred.

The invention also includes a motor starter control for protecting a motor and a motor starter having an ambient temperature sensor for sensing ambient temperature and creating ambient temperature signals therefrom. A pole temperature sensor is provided for sensing a pole temperature in the motor starter and creating pole temperature signals therefrom. The control also has a processor for modeling cool down characteristics after the motor is turned off based on the ambient and pole temperature signals. The processor is also used for ensuring the motor is sufficiently cooled and a maximum number of starts per time period is not exceeded before allowing another motor start.

The control includes a memory for periodically storing ambient and pole temperature signals. The ambient temperature sensor can include a look-up table in the memory having a range of operating temperatures for a given operating environment. The processor is also programmed to compare a set of last start parameters to current start parameters for restricting a motor start. The processor determines a time to a next start and tracks each start request.

The present invention has been described in terms of the preferred embodiment, and it is recognized that equivalents, alternatives, and modifications, aside from those expressly stated, are possible and within the scope of the appending claims.

What is claimed is:

1. A motor starter control for use with a motor starter system comprising:

an ambient temperature sensor to sense ambient temperature and provide an ambient temperature signal indicative of the ambient temperature about a motor starter;

at least one pole temperature sensor in thermal communication with an electrically conducting bus in the motor starter that produces a pole temperature signal indicative of a temperature of the electrically conducting bus;

a processing unit connected to the ambient temperature sensor and the at least one pole temperature sensor, the processing unit programmed to:
model cool down characteristics of a motor starter system;
periodically acquire the ambient and the pole temperature signals from the ambient and the at least one pole temperature sensors;
compare currently acquired ambient and pole temperature signals to the modeled cool down characteristics; and
determine whether the motor starter system is cooled to a safe start temperature.

2. The control of claim 1 wherein the processing unit is further programmed to prevent the motor starter from starting a motor until a cool down temperature is reached that, based on the modeled cool down characteristics, will allow a successful motor start.

3. The control of claim 1 wherein the motor starter system includes at least one of a motor, a motor starter, and an ambient temperature.

4. The control of claim 3 wherein the ambient temperature sensor senses internal ambient temperature of the motor starter, and the ambient temperature of the motor starter system is an external ambient temperature of an operating environment of the motor starter system, and wherein the external ambient temperature is a modeled cool down characteristic used in the comparison act.

5. The control of claim 1 wherein the processing unit is further programmed to compare the currently acquired ambient and pole temperature signals together with the modeled cool down characteristics, to a set of last start parameters, and determine whether a present start will be successful.

6. The control of claim 1 wherein the processing unit is further programmed to ensure that a present start attempt is within a maximum number of starts per time period.

7. The control of claim 1 wherein the processing unit is further programmed to set a fault flag if the motor starter system is above a safe start temperature, calculate and display a time needed to an allowed start, together with an allowed number of starts per time period and a number of starts already made in that time period.

8. The control of claim 1 further comprising a memory unit having at least one look-up table to store temperature data for at least one of a motor, a motor starter, and an ambient condition.

9. The control of claim 1 wherein the processing unit is further programmed to:
create a starter cool down model based at least on the pole temperature signals;
create an external ambient model based at least on the ambient temperature signal; and
create a motor temperature model based at least on motor specifications.

10. The control of claim 1 further comprising:
a motor starter having three power poles, each power pole having a heat sink thereon and a fan in thermal communication with the heat sink;
three pole temperature sensors, each sensor in thermal communication with a power pole of the motor starter and producing first, second, and third pole temperature signals;
a motor connected to the motor starter; and
wherein the processing unit is further programmed to:
model an external ambient temperature;
model a starter temperature;
model a motor temperature;
perform a temperature comparison of the modeled external ambient temperature, the starter temperature, the motor temperature, to the first, second and third pole temperature signals and the ambient temperature signal;
ensure that sufficient cooling has occurred based on the temperature comparison before allowing the motor to start; and
ensure that a motor start request is within a maximum number of motor start requests.

11. A method of protecting a motor and a motor starter comprising the steps of:
periodically monitoring an ambient temperature and a pole temperature of each pole in a motor starter as an indication of a motor starter temperature;
recording the periodically monitored ambient and pole temperatures;
cyclically checking the motor starter temperature to ensure that the motor starter temperature has cooled to a safe start temperature, and if so, checking if the current start parameters are within a safe range; and if so,
enabling a motor start, otherwise
allowing further cooling of the motor starter.

12. The method of clam 11 further comprising the steps of:
tracking motor cool down by periodically monitoring the ambient temperature and the pole temperature during motor cool down; and
modeling external ambient temperature, starter temperature, and motor temperature based on the tracking and predetermined data for a motor, a starter, and an ambient condition for a given application.

13. The method of claim 11 further comprising the step of checking if a current start request, when added to a total number of previous starts per time period, exceeds a total number of allowed starts per time period, and if exceeded, entering into a start delay until the total number of previous starts is less than the total number of allowed starts.

14. The method of claim 12 further comprising the step of displaying a time needed until a next start is permitted.

15. A motor starter control for protecting a motor and a motor starter comprising:
an ambient temperature sensor for sensing ambient temperature and creating ambient temperature signals therefrom;
a pole temperature sensor for sensing a pole temperature in the motor starter and creating pole temperature signals therefrom;
a processor for modeling cool down characteristics after the motor is turned off by the motor starter based on the ambient and pole temperature signals, and for ensuring the motor is sufficiently cooled and a maximum number of starts per time period is not exceeded before allowing another motor start.

16. The control of claim 15 further comprising a memory for periodically storing ambient and pole temperature signals, and wherein the ambient temperature sensor includes a look-up table in the memory having therein a range of operating temperatures for a given operating environment.

17. The control of claim 15 wherein the processor compares last start parameters to current start parameters for restricting a motor start.

18. The control of claim 15 wherein the processor determines a time to next start and tracks each start request, and the control further comprises a display for displaying the time to next start, a number of starts per time period requested, and the maximum number of starts per time period.

19. The control of claim 15 wherein the processor tracks motor cool down and prevents a motor start until a safe condition exists.

20. A motor starter control for use with a motor starter system comprising:
an ambient temperature sensor configured to provide an ambient temperature signal representative of an instantaneous ambient temperature about a motor starter;
at least one pole temperature sensor in thermal communication with an electrically conducting bus in the motor starter and configured to produce a pole temperature signal representative of an instantaneous temperature of the electrically conducting bus;
a processing unit connected to the ambient temperature sensor and the at least one pole temperature sensor, the processing unit programmed to:
identify a number of profiling ambient temperature signals and a number of profiling pole temperature signals of the motor starter, wherein the number of profiling ambient temperature signals and the number of profiling pole temperature signals are acquired during profiling of the motor starter;
determine an estimated cooling profile of a motor starter system from the number of profiling ambient temperature signals and the number of profiling pole temperature signals;
monitor the ambient and the at least one pole temperature sensors during cooling of the motor starter system to compare actual ambient and pole temperature signals to the cooling profile; and
determine whether the motor starter system has cooled to a proper start temperature.

21. The control of claim 20 wherein the processing unit is further programmed to prevent the motor starter from starting a motor until a cool down temperature is reached that, based on the cooling profile, will allow a successful motor start.

22. The control of claim 20 wherein the cooling profile includes an estimate of the ambient temperature and the pole temperature requisitely cool for safe starting of the motor starter system.

23. The control of claim 20 wherein the motor starter system includes at least one of a motor, a motor starter, and an ambient temperature.

24. The control of claim 23 wherein the ambient temperature sensor senses internal ambient temperature of the motor starter, and the ambient temperature of the motor starter system is an external ambient temperature of an operating environment of the motor starter system, and wherein the external ambient temperature is an estimated cool down characteristic used in the comparison act.

25. The control of claim 20 wherein the processing unit is further programmed to compare the actual ambient and pole temperature signals together with the estimated cooling profile, to a set of last start parameters, and determine whether a present start will be successful.

26. The control of claim 20 wherein the processing unit is further programmed to ensure that a present start attempt is within a maximum number of starts per time period.

27. The control of claim 20 wherein the processing unit is further programmed to set a fault flag if the motor starter system is above a safe start temperature, calculate and display a time needed to an allowed start, together with an allowed number of starts per time period and a number of starts already made in that time period.

28. The control of claim 20 further comprising a memory unit having at least one look-up table to store temperature data for at least one of a motor, a motor starter, and an ambient condition.

29. The control of claim 20 wherein the processing unit is further programmed to:

create a starter cooling profile based at least on the profiling pole temperature signals;

create an external ambient profile based at least on the profiling ambient temperature signals; and create a motor temperature profile based at least on motor specifications.

30. The control of claim 20 further comprising:

a motor starter having three power poles, each power pole having a heat sink thereon and a fan in thermal communication with the heat sink;

three pole temperature sensors, each sensor in thermal communication with a power pole of the motor starter and producing a first actual, a second actual, and a third actual pole temperature signal;

a motor connected to the motor starter; and wherein the processing unit is further programmed to:
estimate an external ambient temperature;
estimate a starter temperature;
estimate a motor temperature;
perform a temperature comparison of the estimated external ambient temperature, the starter temperature, the motor temperature, to the first, second and third actual pole temperature signals and the actual ambient temperature signal;
ensure that sufficient cooling has occurred based on the temperature comparison before allowing the motor to start; and
ensure that a motor start request is within a maximum number of motor start requests.

31. The control of claim 20 wherein profiling of the motor starter includes successive starting and stopping of the motor starter.

* * * * *